US006716456B1

(12) United States Patent
Mapelli et al.

(10) Patent No.: US 6,716,456 B1
(45) Date of Patent: Apr. 6, 2004

(54) METHOD FOR PRODUCTION OF MICROCAPSULES

(75) Inventors: Luigi Giovanni Mapelli, Milan (IT); Luca Dobetti, Trieste (IT)

(73) Assignee: Eurand International S.p.A. (IT)

( * ) Notice: Subject to any disclaimer, the term of this patent is extended or adjusted under 35 U.S.C. 154(b) by 0 days.

(21) Appl. No.: 10/019,363

(22) PCT Filed: Apr. 20, 2000

(86) PCT No.: PCT/EP00/03587

§ 371 (c)(1),
(2), (4) Date: Oct. 25, 2001

(87) PCT Pub. No.: WO00/64575

PCT Pub. Date: Nov. 2, 2000

(30) Foreign Application Priority Data

Apr. 26, 1999 (GB) .............................................. 9909369

(51) Int. Cl.⁷ ............................. A61K 9/50; A61K 9/00; A61K 9/14; A61K 9/16
(52) U.S. Cl. ...................... 424/490; 424/400; 424/489; 424/493; 424/495; 424/497
(58) Field of Search ............................. 264/4.1; 424/489, 424/497, 400, 490; 427/213.3, 213.31, 213.32, 213.34

(56) References Cited

U.S. PATENT DOCUMENTS

| 3,341,416 | A | | 9/1967 | Anderson et al. |
| 4,460,563 | A | | 7/1984 | Calanchi |
| 4,776,012 | A | | 10/1988 | Zscheile, Jr. et al. |
| 4,963,367 | A | * | 10/1990 | Ecanow |
| 5,238,686 | A | * | 8/1993 | Eichel et al. |
| 5,298,529 | A | | 3/1994 | Narayanan |

FOREIGN PATENT DOCUMENTS

| EP | 0212751 | 3/1987 |
| EP | 0867174 | 9/1998 |
| WO | WO 85/00105 | 1/1985 |

OTHER PUBLICATIONS

Thomasin, C. et al., *Drug mICROEncapsulation by PLA/ PLGA Coacervation in the Light of Thermodynamics. 2. Parameters Detemrining Microsphere Formation*, Journal of Pharmaceutical Sciences, vol. 87, No. 3, pp. 269–275 (03/98).

Calanchi, M. et al., *Taste–maSking of oral formulations*, Formulation and Finishing, reprinted from Pharmaceutical Manufacturing International (1996).

Nihant, N. et al., *Microencapsulation by coacervation of poly(lactide–co–glycolide) IV. Effect of the processing parameters on coacervation and encapsulation*, Journal of Controlled Release, 35, pp. 117–125 (1995).

* cited by examiner

*Primary Examiner*—James M. Spear
*Assistant Examiner*—Simon J. Oh
(74) *Attorney, Agent, or Firm*—Thompson Hine LLP

(57) ABSTRACT

The invention provides a process for microencapsulating a pharmaceutical substrate comprising the steps of: a) adding insoluble or sparingly soluble particles of the substrate to be microencapsulated to a stable buffer solution having a high ionic strength; b) dissolving a membrane-forming ionic polymer in the buffer; c) forming a coacervate by adding a water-complexing compound causing phase separation of the resulting mixture; and d) allowing the deposition of the coacervate onto the substrate so as to create a coating of polymer around the substrate.

9 Claims, No Drawings

METHOD FOR PRODUCTION OF MICROCAPSULES

FIELD OF THE INVENTION

The present invention relates to the field of microcapsule production by coaceravation phase separation.

PRIOR ART

Coacervation is phenomenon consisting of the salting out of macromolecules into liquid-like colloidal droplets rather than solid or gel aggregates. The separation of a polymer-rich liquid phase occurs via the action of one or more inducers, such as the variation of the temperature, or the addition of salts, non-solvents or incompatible compounds.

Liquid droplets or solid particles are suspended in the microencapsulation medium (water or organic solvent) where they are insoluble. The coacervates are able to surround and preferably uniformly engulf the particles with a fluid film of polymer.

The fluid polymeric film may be solidified (solid or gel phase) and hardened by an appropriate method, such as temperature or pH variation, or chemical reaction. The microcapsules may be separated by settling or filtration, and then washed, filtered and dried.

Microencapsulation by coacervation is an effective coating technology for taste masking, sustained/controlled release and avoiding gastric irritation of drugs as well as for the technological and stability improvement of the product, e.g. separation of incompatible substances, improved stability, increased flowability and conversion of liquid substances into a free-flowing powder (M. Calanchi and S. Ghanta; Taste-masking of oral formulations, Pharmaceutical Manufacturing International, 139–141 (1996)).

The microcapsules may be formulated into a variety of final dosage forms including tablets (eg chewable, dispersible, fast dissolving, effervescent), hard gelatin capsules and permanent or temporary suspensions (eg granulates, dry mono-dose sachets; M. Calanchi, S. Ghanta, supra).

Microencapsulation uses either organic solvents or aqueous media for drugs insoluble in organic solvents or water, respectively. In general, the process can generate microcapsules in sizes from less than one micron to over one millimeter. Various processes have attempted in the prior art to produce microcapsules in an aqueous system. For example, EPO 0212751A, discloses microencapsulation by dissolving a coating agent in water by salification, dispersing the medicament particles first in water, then in the solution of salified coating agent to form a suspension, and adding an acidifying agent thereto to precipitate the coating agent onto the particles of medicament and recovering the microcapsules thus formed.

U.S. Pat. No. 4,460,563 (Calanchi), relates to a process for preparing microcapsules in a liquid vehicle, preferably an aqueous medium, where the formation of a coacervate is obtained by adding a substance to cause phase separation. The present invention relates to the preparation of microcapsules of water insoluble, or sparingly water soluble, compounds in a buffered aqueous solution at high buffer ionic strength (high buffer concentration or capacity), by coacervation phase separation of a ionic polymer (polyelectrolyte) previously dissolved in the water solution as its salified form. The coacervate formation is induced by the addition of a substance which can bind the water forming an aqueous complex and cause the phase separation. The Hofmeister (lyotropic) salts are a particular class of substances which form water complexes and cause phase separation. The Hofmeister effect and the behaviour of water at interfaces is described in Quarterly Review of Biophysics 18 (4), 323–422, 1985.

In EP 02120751/A3 and WO 85/00105, the phase separation or precipitation of an engulfing polymer is induced by the pH change of the system. Moreover, the presence of only an acid organic compound is described in WO 85/00105.

Using the process described in U.S. Pat. No. 4,460,563, it has been found that the pH of the water solution (deionized water or sodium bicarbonate solution) changes when the solution is in contact with the air or when a weakly acid or alkaline compound is suspended in the solution. In the first case, the rate and extent of the pH change increased when the solution was stirred.

In fact, carbon dioxide is normally formed in suitable conditions of pH from a sodium bicarbonate solution. Carbon dioxide can easily evaporate resulting in a pH change of the solution. Moreover, the addition of an acid or alkaline compound, sparingly soluble in water, shifts easily the initial pH of the bicarbonate solution, since the buffering characteristics and capacity of sodium bicarbonate are scarce. From these considerations, sodium bicarbonate can be classified as an "unstable" buffer.

Difficulties have been experienced in controlling pH during the dissolution of a coating polymer into a bicarbonate solution, and a drastic change of pH (more than 2 units) has been observed after the addition of a weakly acid or alkaline compound, sparingly soluble in an aqueous solution.

SUMMARY

The present invention relates to a process for preparing microcapsules in an aqueous vehicle. The microcapsules consist of a core of water insoluble or sparingly soluble drugs and a membrane of a chargeable polymer (polyelectrolyte), soluble in the aqueous vehicle, enclosing the core. The microcapsules may vary in size from a few microns to hundreds or thousands microns. The aqueous vehicle comprises a stable buffer solution having high buffering capacity and ionic strength.

DETAILED DESCRIPTION OF THE INVENTION

The present invention uses "stable buffers" (such as phosphate, citrate, tartrate or acetate buffers) which do not generate gaseous substances, and at the same time increases the buffer capacity, so as to increase the buffer ionic strength which is defined as:

$$I = \tfrac{1}{2} * \Sigma(c_i * z_i^2)$$

where I is the ionic strength, $c_i$ and $z_i$ are the molar concentration and charge of each ion species, respectively.

It has now surprisingly been found that by increasing the ionic strength of the buffer solution the amount of the phase separation inducing agent (lyotropic salt or water-complexing compound) required to effect coacervation phase separation can be reduced.

Using a stable buffer with a high ionic strength allows to:
1. reduce the amount of coacervation inducing agent necessary to effect the polymeric phase separation (coacervation).
2. Reduce the time ("stability window") necessary for the liquid-like colloidal polymeric phase to engulf the solid particles.

The combined effects 1. and 2. allow to increase substantially the efficiency microencapsulation process, i.e. the microencapsulation yield.

Phase separation may be divided into different stages, each of them characterized by a typical appearance, Theological behaviour and phase volume. Only when a stable dispersion of well defined coacervate droplets with a suitable viscosity is formed is the drug surrounded and engulfed by the polymeric film. The behaviour and the stability of coacervate droplets in this stage are the most critical point for the successive transfer of the drug-coacervate dispersion into the hardening phase and the isolation of discrete microcapsules therefrom (C. Thomasin, H. P. Merkle, B. Gender. Drug microencapsulation by PLA/PLGA coacervation in the light of thermodynamics. 2. Parameters determining microsphere formation. J. Pharm. Sci. 87(3), 269–275 (1998)). This may be called the "stability window" for microencapsulation.

Outside the stability window, particle enwrapping does not occur because either the viscosity condition of the coacervate emulsion does not permit the drug enwrapping (lower induction limit) or aggregation and precipitation of polymer droplets occur (higher induction limit).

The kinetics of phase separation influences the engulfing of the solid particle in the "stability window". In fact, the distribution of polymeric fluid film around the insoluble particles is more uniform at a slower phase separation rate. This results in the formation of single microcapsules having homogeneous physico-chemical characteristics (particle size distribution, film thickness and porosity): N. Nihant, C. Grandfils, R. Jerome, P. TeyssiÉ. Microencapsulation by coacervation of poly(lactide-co-glycolide) IV. Effect of the processing parameters on coacervation and encapsulation. J. Controlled Release 35, 117–125 (1995).

According to the present invention there is provided a process for microencapsulating a substrate which is insoluble or sparingly soluble in water comprising the steps of:
a) combining particles of the substrate to be microencapsulated with a membrane-forming ionic polymer and aqueous buffer solution having an ionic strength of at least 0.2 and eventually comprising up to 30% w/w of an organic solvent;
b) forming a coacervate by adding an agent which can bind the water forming an aqueous complex and cause phase separation of the resulting mixture; and
c) allowing the deposition of the coacervate onto the substrate so as to create a coating of polymer around the substrate.

Suitably, the polymer coating is then allowed to solidify on the substrate. The ionic strength of the buffer solution is at least 0.2, preferably at least 0.3, suitably at least 0.45.

The coating level can vary from about 1% to 70% of the total microcapsule weight, preferably from 2% to 50% of the total weight.

The coating ionic polymer can be selected among all those polymers which are soluble in aqueous buffer solutions at suitable pH. Non-limiting examples are cellulose derivatives such as cellulose acetate phthalate, cellulose acetate trimellitate, hydroxypropylmethylcellulose phthalate, carboxymethyl cellulose, carboxymethylethyl cellulose, ionic polysaccharides such as alginic acid, pectin acid, xanthan gum, the carrageenans, chitosan and its derivatives, and ionic acrylic polymers available under the trade name of "EUDRAGIT" (type E, L and S).

Suitably the anionic polymer may be present in the reaction medium in an amount of from about 0.1% w/w to about 20% w/w.

The organic solvent must be soluble in the aqueous buffer solution and may be present in an amount up to 30% w/w. Non-limiting examples are acetone, methanol, ethanol, isopropanol.

By "stable buffer" are meant buffering coupled substances which do not generate gaseous molecules in any of their equilibria in aqueous solution. Non-limiting examples are phosphate buffer, acetate buffer, citrate buffer and Tris.

Suitably the stable buffer salt(s) may be present in the reaction medium in an amount of from about 0.1% w/w to about 30% w/w, as necessary to attain the desired pH and ionic strength.

Examples of water-complexing compounds causing phase separation are the lyotropic salts of the Hofmeister series and mono or oligo saccharides such as glucose, sorbitol, xylitol and sucrose. Examples of lyotropic salts (Hofmeister series) are sodium sulphate, ammonium sulphate, litium sulphate, sodium citrate, sodium tartrate and sodium hexametaphosphate. Preferably the lyotropic salt is sodium sulphate.

At the end of the particle enwrapping phase, it is possible to add a membrane-solidifying agent.

The membrane solidifying agent is an acid substance. Non-limiting examples thereof are tartaric acid, citric acid, fumaric acid and diluted hydrochloric acid.

It has been found that the addition of small amounts of surfactants in the initial stage of microencapsulation facilitates the deposition of the polymeric membrane around the particles/cores. Non-limiting examples of suitable such surfactants are sodium lauryl sulphate, sodium dioctyl sulfosuccinate, polyoxyethylene sorbitan fatty acid esters such as those available under the trade name "TWEEN" and sorbitan fatty acid esters such as those available under the trade name "SPAN".

Suitably such sufactant(s) may be present in the reaction medium in an amount of from about 0.01% w/w to about 10% w/w.

The properties of the membrane such as plasticity, impermeability, may be improved by adding plasticizers. Non-limiting examples of suitable such plasticizers include dibutyl phthalate, dibutyl sebacate, triacetin and acetylated mono-glycerides.

Suitably such plasticizer(s) may be present in the reaction medium in an amount of from about 0.01% w/w to about 10% w/w.

Additives such as adsorbents or dehydratants may be used for improving the drying of the microcapsules. Non-limiting examples thereof include colloidal silicon dioxides such as those available under the trade names SYLOID, AEROSIL and CARB-O-SIL and sodium sulfate.

Microencapsulation can be carried out on all solid substances which are insoluble or sparingly soluble in the used liquid vehicle at the pH used for microencapsulation. These substances should also be substantially non-reactive with the membrane and with any other substances used in the microencapsulation process.

Non-limiting examples of drugs which can be microencapsulated by the process of the present invention include non-steroidic antiinflamrnatory/analgesic drugs such as ibuprofen, ketoprofen, flubiprofen, naproxen, paracetamol, phenylbutazone, antibiotics such as amoxicillin, ampicillin, cephalexin, roxithromycin, chloramphenicol, erythromycin, fosfomycin, antihypertensive drugs such as nifedipine, nicergoline, captopril, nicardipine, steroidic antiinflammatory drugs such as cortisone and derivatives, salbutamol, beclomethasone andsteroids such as progesterone, estriol, estradiol and antheliminticdrugs such as praziquantel.

The present invention is illustrated in the following non-limiting examples and comparative examples.

EXPERIMENTAL PART

Example 1

Bicarbonate Buffer (Reference Solution)

An aqueous solution of 1 liter containing 25 g cellulose acetate phthalate and 6.5 g sodium bicarbonate ($NaHCO_3$) was prepared. To this solution, 114 g ibuprofen was added. The ionic strength of this buffer was <0.02.

The pH of the solution before and after the addition of ibuprofen particles was determined (results are shown in Table 1).

A solution of 20% w/w aqueous sodium sulfate ($Na_2SO_4$), 0.08% w/w aqueous monobasic potassium phosphate, 0.14% w/w aqueous sodium hydroxide and 0.11% w/w aqueous hydrochloric acid was added to the bicarbonate solution at an addition rate of 30 g solution/min under stirring conditions.

The process yield shown in the table 1 below was calculated as the percent ratio between the volume of the initial solution (containing buffer, drug particles and polymer) and the volume of the solution at the end of the particle enwrapping phase (containing, in addition to the above components, the solution of phase separating agent necessary to achieve complete encapsulation); a higher yield means a lower amount of the phase-separating agent required.

Phosphate Buffer (Solution According to the Invention)

An aqueous buffer solution of 1 liter containing 25 g cellulose acetate phthalate, 24.9 g dibasic sodium pnosphate ($Na_2HPO_4$) and 12.4 g monobasic potassium phosphate ($KH_2PO_4$) was prepared. To this solution, 114 g ibuprofen particles was added. The ionic strength of this buffer was 0.5.

The pH of the solution before and after the addition of ibuprofen was determined (results are shown in Table 1).

A solution of 20% w/w aqueous sodium sulfate was added to the phosphate solution at an addition rate of 30 g solution/min under stirring conditions: the amount of sodium sulphate solution for starting the coacervation and for ending the particle enwrapping (microencapsulation) was determined (results are shown in Table 1).

The process yield, calculated as shown above, is reported in Table 1 below.

TABLE 1

| Buffer | Bicarbonate | Phosphate |
|---|---|---|
| pH before the addition of ibuprofen | 8.0–8.2 | 6.6–6.7 |
| pH after the addition of ibuprofen | 6.2–6.4 | 6.6–6.7 |
| ΔpH of process (after the addition of ibuprofen) | 0.5–0.6 | <0.3 |
| Amount of Na2SO4 solution for starting the coacervation (g) | 300 | 115 |
| Amount of Na2SO4 solution for microencapsulation (g) | 610 | 230 |
| Process Yield (%) | 62 | 81 |

It can be noted that the microencapsulation yield is substantially higher when the stable buffer having a high ionic strength according to the invention is used instead of the reference buffer.

Example 2

Aqueous solutions of 1 liter containing 25 g cellulose acetate phthalate and amounts of dibasic sodium phosphate ($Na_2HPO_4$) and monobasic potassium phosphate ($KH_2PO_4$) as below were prepared. To each solution was added 114 g ibuprofen particles. The ionic strength of the preparations was as reported in Table 2. The pH of all solutions was 6.6.

a) 0.2 g $KH_2PO_4$ and 15.0 g $Na_2HPO_4$
b) 8.3 g $KH_2PO_4$ and 21.6 g $Na_2HPO_4$
c) 12.4 g $KH_2PO_4$ and 24.9 g $Na_2HPO_4$
d) 16.5 g $KH_2PO_4$ and 28.4 g $Na_2HPO_4$
e) 20.6 g $KH_2PO_4$ and 31.6 g $Na_2HPO_4$ A solution of 20% w/w aqueous sodium sulfate was added to the phosphate solution at an addition rate of 30 g solution/min under stirring conditions.

The amount of sodium sulphate solution for starting the coacervation and for ending the particle enwrapping (microencapsulation) was determined. Results are reported in Table 2 below for each of the various aqueous buffer solutions (a to e) at various buffer ionic strength.

The process yield, calculated as shown above, is reported in Table 2 below.

TABLE 2

| Aqueous buffer solution | a) | b) | c) | d) | e) |
|---|---|---|---|---|---|
| Ionic Strength | 0.2 | 0.4 | 0.5 | 0.6 | 0.7 |
| Amount of Na2SO4 solution for starting the coacervation (g) | 270 | 170 | 115 | 75 | 30 |
| Amount of Na2SO4 solution for microencapsulation (g) | 430 | 315 | 230 | 185 | 130 |
| Process Yield (%) | 70 | 74 | 81 | 84 | 88 |

It can be noted that all compositions a)–e) in accordance with the present invention show a distinctly high microencapsulation yield.

Example 3

An aqueous solution of 1 liter containing 25 g hydroxypropylmethyl cellulose phtalate (HP 55), 25.2 g monobasic potassium phosphate ($KH_2PO_4$) and 42.1 dibasic potassium dphosphate ($K_2HPO_4$ was prepared. The ionic strength of the buffer solution was 0.8. To this solution, 114 g ibuprofen was added.

A solution of 20% w/w aqueous sodium sulphate was added at an addition rate of 30 g solution/rnin under stirring conditions. The amount of sodium sulphate solution for starting the coacervation and for ending the particle enwrapping (microencapsulation) was 135 g and 320 g, respectively.

The process yield, expressed as amount of initial polymer solution to amount of solution at the end point is 76%.

Example 4

An aqueous solution of 1 liter containing 25 g cellulose acetate phtalate, 12.4 g monobasic potassium phosphate ($KH_2PO_4$) and 24.9 g dibasic sodium phosphate ($Na_2HPO_4$) was prepared. The ionic strength of the buffer solution was 0.5. To this solution, 114 g ibuprofen was added.

A solution of 40% w/w aqueous sorbitol was added to the phosphate solution at an addition rate of 30 g solution/min under stirring conditions. The amount of sorbitol solution for starting the coacervation and for ending the particle enwrapping (microencapsulation) was 150 g and 305 g, respectively. The process yield, expressed as amount of initial polymer solution to amount of solution at the end point is 77%.

Example 5

A 80:20 w/w water/isopropanol solution of 1 liter containing 25 g Eudragit L 100–55, 3.6 g monobasic potassium phosphate (KH$_2$PO$_4$) and 32.4 g dibasic sodium phosphate (Na$_2$HPO$_4$) was prepared. The ionic strength of the buffer solution was 0.3 (for the calculation, the polymer was considered equally partitioned between the aqueous and organic solvents). To this solution, 114 g ibuprofen was added.

A solution of 20% w/w aqueous sodium sulphate was added at an addition rate of 30 g solution/min under stirring conditions. The amount of sodium sulphate solution for starting the coacervation and for ending the particle enwrapping (microencapsulation) was 85 g and 180 g, respectively.

The process yield, expressed as amount of initial polymer solution to amount of solution at the end point is 85%.

What is claimed:

1. A process for microencapsulating a substrate which is insoluble or sparingly soluble in water comprising the steps of:
   a) combining particles of the substrate to be microencapsulated with a membrane-forming ionic polymer and an aqueous buffer solution having an ionic strength of at least 0.3 and eventually comprising up to 30% w/w of an organic solvent;
   b) forming a coacervate by adding an agent which combine the water forming and aqueous complex and cause phase separation of the resulting mixture; and
   c) allowing the deposition of the coacervate onto the substrate so as to create a coating of polymer around the substrate.

2. A process as claimed in claim 1 comprising a further step of allowing the polymer coating to solidify on the substrate.

3. A process according to claim 1 wherein the ionic strength of the buffer solution is at least 0.45.

4. A process according to claim 1 wherein the ionic polymer is a cellulose derivative.

5. A process according to claim 1 wherein the ionic polymer is cellulose acetate phthalate.

6. A process according to claim 1 wherein the ionic polymer is hydroxypropylmethylcellulosephthalate.

7. A process according to claim 1 wherein said agent is sodium sulfate.

8. A process according to claim 1 wherein the substrate comprises particles of a pharmaceutically active substance having an average particle size of from about 1 micron to about 5,000 microns.

9. A process according to claim 1 wherein the ionic polymer is an anionic polymer.

* * * * *